(12) United States Patent
Yang et al.

(10) Patent No.: US 11,773,259 B2
(45) Date of Patent: Oct. 3, 2023

(54) POLYCARBONATE COMPOSITION AND OPTICAL PRODUCT FORMED THEREFROM

(71) Applicant: LG CHEM, LTD., Seoul (KR)

(72) Inventors: Young In Yang, Daejeon (KR); Byoungkue Jeon, Daejeon (KR); Mooho Hong, Daejeon (KR); Seongmi Cho, Daejeon (KR); Hoyong Lee, Daejeon (KR); Jihye Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 189 days.

(21) Appl. No.: 17/432,196

(22) PCT Filed: Nov. 25, 2020

(86) PCT No.: PCT/KR2020/016759
§ 371 (c)(1),
(2) Date: Aug. 19, 2021

(87) PCT Pub. No.: WO2021/112473
PCT Pub. Date: Jun. 10, 2021

(65) Prior Publication Data
US 2022/0186025 A1    Jun. 16, 2022

(30) Foreign Application Priority Data

Dec. 4, 2019 (KR) .................. 10-2019-0160110
Nov. 24, 2020 (KR) .................. 10-2020-0159262
Nov. 24, 2020 (KR) .................. 10-2020-0159263
Nov. 24, 2020 (KR) .................. 10-2020-0159264

(51) Int. Cl.
*C08L 69/00* (2006.01)
*C08K 5/315* (2006.01)
*G02B 1/04* (2006.01)

(52) U.S. Cl.
CPC .............. *C08L 69/00* (2013.01); *C08K 5/315* (2013.01); *G02B 1/041* (2013.01); *C08L 2201/10* (2013.01)

(58) Field of Classification Search
CPC .......... C08L 69/00; C08K 5/315; G02B 1/041
See application file for complete search history.

(56) References Cited

U.S. PATENT DOCUMENTS

| | | | |
|---|---|---|---|
| 5,840,282 | A | 11/1998 | Gonzenbach et al. |
| 6,867,205 | B2 | 3/2005 | Boehringer et al. |
| 7,022,718 | B2 | 4/2006 | Boehringer et al. |
| 7,094,510 | B2 | 8/2006 | Jubran et al. |
| 7,652,082 | B2 | 1/2010 | Rudiger et al. |
| 2010/0113641 | A1 | 5/2010 | Laredo |
| 2013/0009059 | A1 | 1/2013 | Caruso |
| 2015/0370094 | A1 | 12/2015 | Hashimoto et al. |
| 2016/0017218 | A1 | 1/2016 | Kojima et al. |
| 2016/0304701 | A1 | 10/2016 | Kakinuma et al. |
| 2016/0313575 | A1 | 10/2016 | Kakinuma et al. |
| 2019/0107647 | A1 | 4/2019 | Fromentin |
| 2019/0330466 | A1 | 10/2019 | Bahn et al. |
| 2020/0165413 | A1 | 5/2020 | Hwang et al. |
| 2021/0292550 | A1 | 9/2021 | Jeon et al. |

FOREIGN PATENT DOCUMENTS

| | | |
|---|---|---|
| CN | 109563336 A | 4/2019 |
| CN | 110709470 A | 1/2020 |
| EP | 3632985 A1 | 4/2020 |
| EP | 3808807 A1 | 4/2021 |
| JP | H09-002930 | 1/1997 |
| JP | H09-157512 | 6/1997 |
| JP | 2007-070630 | 3/2007 |
| JP | 2010-522356 | 7/2010 |
| KR | 10-2004-0077463 | 9/2004 |
| KR | 10-2004-0089619 | 10/2004 |
| KR | 10-2018-0130529 | 12/2018 |
| WO | 2014-133111 | 9/2014 |
| WO | 2019-066493 | 4/2019 |
| WO | 2020-040504 | 2/2020 |

OTHER PUBLICATIONS

Office Action of Chinese Patent Office in Appl'n No. 202080014803.6, dated Oct. 10, 2022.
Office Action of Japanese Patent Office in Appl'n No. 2021-547258, dated Aug. 25, 2022.
Database WPI, Week 201934, Thomson Scientific, London, GB, AN 2019-33078M, XP002805999.
Priyadharshini et al., "Bulk crystal growth, spectral, optical, thermal, electrical and third-order NLO properties of benzylidene malononitrile derivative single crystal: a promising material for nonlinear optical device applications," Journal of Materials Science: Materials in Electronics 29(4):2698-2708 (2018).
Pasha et al., "Sodium carbonate: A versatile catalyst for Knoevenagel condensation", Indian Journal of Chemistry 49B:1428-1431 (2010).
Extended Search Report for European Patent Office in Appl'n No. 20896773.7, dated Apr. 4, 2022.

*Primary Examiner* — Marc S Zimmer
*Assistant Examiner* — Surbhi M Du
(74) *Attorney, Agent, or Firm* — Bryan Cave Leighton Paisner LLP

(57) ABSTRACT

Provided is a polycarbonate composition comprising a polycarbonate and a light blocking agent, and an optical product formed therefrom. The polycarbonate composition has a low yellow index, unlike conventional yellowish blue light-blocking products, and thus various colors can be implemented. Accordingly, it is possible to provide optical products with various colors, and the polycarbonate composition is very suitable for spectacles required to have high transparency and to block blue light that is harmful to eyes.

20 Claims, No Drawings

POLYCARBONATE COMPOSITION AND OPTICAL PRODUCT FORMED THEREFROM

CROSS-REFERENCE TO RELATED APPLICATIONS

This application is a National Stage Application of International Application No. PCT/KR2020/016759 filed on Nov. 25, 2020, which claims the benefit of Korean Patent Application Nos. 10-2019-0160110 filed on Dec. 4, 2019, 10-2020-0159262 filed on Nov. 24, 2020, 10-2020-0159263 filed on Nov. 24, 2020, and 10-2020-0159264 filed on Nov. 24, 2020, with the Korean Intellectual Property Office, the disclosure of each of which is incorporated herein by reference in its entirety.

TECHNICAL FIELD

The present disclosure relates to a polycarbonate composition and an optical product formed therefrom.

BACKGROUND

Polycarbonates are prepared by condensation-polymerization of an aromatic diol compound such as bisphenol A with a carbonate precursor such as phosgene. The polycarbonates thus prepared have excellent impact strength, dimensional stability, heat resistance and transparency, and are applied to a wide range of fields such as exterior materials of electrical and electronic products, automobile parts, building materials, optical components and clothing materials.

In particular, the range of use of polycarbonate is continuously expanding in the field related to optical components due to its transparency. Spectacles, one of the optical components, are required to control a light transmittance in various wavelength ranges. Recently, as it is known that blue light is harmful to the eyes, the spectacles are required to exhibit sufficiently low light transmittance in the region of 380 to 500 nm. However, a light blocking agent added to block blue light makes optical products made from polycarbonate yellowish. Therefore, there is an urgent need for research to provide an optical component that is transparent and can effectively block the blue light.

BRIEF DESCRIPTION

Technical Problem

In the present disclosure, there is provided a polycarbonate composition.

There is also provided an optical product formed from the polycarbonate composition.

Technical Solution

According to an embodiment of the present disclosure, there is provided a polycarbonate composition including a polycarbonate and a light blocking agent, wherein 5YT420 calculated by the following Equation 1 is 2.5 to 71:

$$5YT420 = (5*Y) + T420 \qquad \text{<Equation 1>}$$

wherein in Equation 1, Y is a yellow index measured according to ASTM D1925 for a specimen having a thickness of 3 mm formed from the polycarbonate composition, and T420 is a transmittance at 420 nm measured according to ASTM D1003.

According to another embodiment of the present disclosure, there is provided an optical product formed from the polycarbonate composition.

Advantageous Effects

The polycarbonate composition according to an embodiment of the present disclosure can block blue light without a problem of harmfulness while maintaining various physical properties such as inherent transparency and impact resistance at an excellent level. In particular, the polycarbonate composition has a low yellow index, unlike conventional yellowish blue light blocking products, and thus various colors can be implemented. Accordingly, it is possible to provide optical products with various colors, and it is very suitable for spectacles required to have high transparency and to block blue light that is harmful to the eyes.

DETAILED DESCRIPTION

Hereinafter, the polycarbonate composition and the optical product formed therefrom according to specific embodiments of the present disclosure will be described.

According to an embodiment of the present disclosure, there is provided a polycarbonate composition including a polycarbonate and a light blocking agent, wherein 5YT420 calculated by the following Equation 1 is 2.5 to 71:

$$5YT420 = (5*Y) + T420 \qquad \text{<Equation 1>}$$

wherein in Equation 1, Y is a yellow index measured according to ASTM D1925 for a specimen having a thickness of 3 mm formed from the polycarbonate composition, and T420 is a transmittance at 420 nm measured according to ASTM D1003.

Conventional blue light blocking products have a yellowish color due to a light blocking agent added to block blue light, so it is difficult to use them for various purposes. In particular, there is a trade-off between a yellow index and a blue light transmittance, and thus the higher the blue light blocking efficiency, the more yellowish the product becomes.

The present inventors have researched this and developed a polycarbonate composition capable of providing an optical product having a low transmittance in a blue light region while having a low yellow index, and completed the present invention.

Specifically, in the polycarbonate composition, the blue light transmittance decreases sharply compared to the increase in the yellow index, so that 5YT420 calculated by the above Equation 1, which is an index capable of confirming a balance between the yellow index and the blue light transmittance, can be 2.5 to 71.

The 5YT420 is a value obtained by adding the transmittance at 420 nm to a value 5 times the yellow index. Even if the blue light transmittance is at the same level, the 5YT420 appears as a large value when the yellow index increases sharply compared to the decrease in the blue light transmittance, and it appears as a small value when the yellow index does not increase significantly compared to the decrease in the blue light transmittance. Therefore, it can be understood that the lower the value of 5YT420, the better both the yellow index and the blue light transmittance.

The polycarbonate composition according to the embodiment can have 5YT420 calculated by the Equation 1 of 10 to 71, 30 to 71, 50 to 71, 60 to 71, 60 to 70, 60 to 68, 60 to 66, 60 to 65, or 61 to 64.

The polycarbonate composition according to the embodiment can have YT410 calculated by the following Equation 2 of 2 to 13.

$$YT410 = Y + T410 \qquad \text{<Equation 2>}$$

wherein in Equation 2, Y is a yellow index measured according to ASTM D1925 for a specimen having a thickness of 3 mm formed from the polycarbonate composition, and T410 is a transmittance at 410 nm measured according to ASTM D1003.

The YT410 is a value obtained by adding the transmittance at 410 nm to the yellow index, and it can be understood that the lower the value, the better both the yellow index and the blue light transmittance, as in 5YT420.

The polycarbonate composition according to the embodiment can have YT410 calculated by the Equation 2 of 5 to 13, 7 to 13, 9 to 13, 5 to 12.5, 7 to 12, 9 to 11, or 9 to 10.

The polycarbonate composition according to the embodiment has a small 5YT420 value, which is an index capable of confirming a balance between the yellow index and the blue light transmittance, and thus can exhibit a low blue light transmittance.

Specifically, the polycarbonate composition has a transmittance at 420 nm measured according to ASTM D1003 for a specimen having a thickness of 3 mm formed therefrom of 0.1 to 47%, 0.1 to 40%, 0.1 to 35%, 0.1 to 30%, 0.1 to 25%, 0.1 to 20%, 15 to 30%, or 20 to 27%, thereby exhibiting a very excellent blue light blocking effect.

Specifically, the polycarbonate composition has a transmittance at 410 nm measured according to ASTM D1003 for a specimen having a thickness of 3 mm formed therefrom of 0.01 to 6.0%, 0.01 to 5.0%, 0.01 to 3.0%, 0.01 to 2.7%, 1.0 to 5.0%, 2.0 to 3.0%, or 2.0 to 2.7%, thereby exhibiting a very excellent blue light blocking effect.

The polycarbonate composition according to the embodiment has a small 5YT420 value, which is an index capable of confirming a balance between the yellow index and the blue light transmittance, and thus can exhibit a low yellow index.

Specifically, the polycarbonate composition has a very low yellow index measured according to ASTM D1925 for a specimen having a thickness of 3 mm formed therefrom of 0.1 to 11.5, 0.1 to 10.0, 0.1 to 9.0, 1.0 to 10.0, 3.0 to 9.0, or 5.0 to 9.0, thereby exhibiting transparent properties.

In addition, the polycarbonate composition according to the embodiment can achieve a blue light blocking effect while maintaining excellent intrinsic properties of the polycarbonate, thereby exhibiting excellent impact resistance.

Specifically, the polycarbonate composition has an impact strength measured according to ASTM D256 for a specimen having a thickness of 6.35 mm formed therefrom of 680 to 800 J/m, 690 to 800 J/m, 700 to 800 J/m, 710 to 800 J/m, 715 to 800 J/m, 680 to 750 J/m, 690 to 730 J/m, or 700 to 730 J/m, exhibiting very high impact resistance. Accordingly, it is expected that the polycarbonate composition according to the embodiment can exhibit a blue light blocking effect while maintaining the transparency and impact resistance inherent in polycarbonate at an excellent level, thereby overcoming the limitation in application of the conventional blue light blocking products.

The polycarbonate composition according to the above embodiment can have a blue light blocking effect without a problem of harmfulness. Accordingly, an amount of total volatile organic compounds (TVOC) released for 15 minutes at 280° C. in a specimen having a thickness of 3 mm formed from the polycarbonate composition can be 0 to 210 ppm, 0 to 200 ppm, 0 to 150 ppm, 0 to 120 ppm, 0 to 100 ppm, 0 to 70 ppm, 50 to 150 ppm, or 60 to 120 ppm, indicating very little harmful substances.

The polycarbonate composition according to the embodiment includes a polycarbonate and a light blocking agent, and the light blocking agent includes a compound of the following Chemical Formula 1 to provide a transparent optical product capable of effectively blocking blue light:

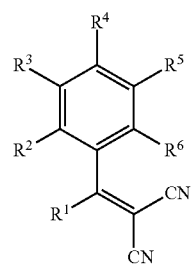

Chemical Formula 1 wherein in Chemical Formula 1:

$R^1$ is hydrogen, halogen, a hydroxyl group or a cyano group; and $R^2$ to $R^6$ are each independently hydrogen, halogen, a hydroxyl group, a cyano group, or a C1 to C5 alkoxy group, provided that at least one of $R^2$ to $R^6$ is halogen, a hydroxyl group, a cyano group, or a C1 to C5 alkoxy group.

In Chemical Formula 1, when $R^1$ is halogen, it can be F, Cl, Br or I. Specifically, in Chemical Formula 1, $R^1$ can be hydrogen.

In Chemical Formula 1, when at least one of $R^2$ to $R^6$ is halogen, it can be F, Cl, Br, or I, and when at least one of $R^2$ to $R^6$ is a C1 to C5 alkoxy group, it can be a methoxy group, an ethoxy group, a n-propoxy group, an isopropoxy group, a n-butoxy group, an isobutoxy group, a t-butoxy group, a n-pentoxy group, an isopentoxy group, or a neopentoxy group.

Specifically, in Chemical Formula 1, at least one of $R^2$ to $R^6$ can be a C1 to C5 alkoxy group, and the rest can be hydrogen, halogen, a hydroxyl group, a cyano group, or a C1 to C5 alkoxy group. More specifically, in Chemical Formula 1, 2 to 4 of $R^2$ to $R^6$ can be C1 to C5 alkoxy groups, and the rest can be hydrogen. In this case, the C1 to C5 alkoxy group can be a methoxy group or an ethoxy group, and can preferably be a methoxy group.

The compound of Chemical Formula 1 can effectively block blue light even if only a small amount is used compared to the conventional light blocking agent. For example, the light blocking agent can be used in an amount of 0.001 to 0.500 wt %, 0.005 to 0.400 wt %, 0.010 to 0.300 wt %, 0.015 to 0.400 wt %, 0.020 to 0.300 wt %, 0.040 to 0.250 wt %, 0.050 to 0.250 wt %, or 0.050 to 0.150 wt % based on a total weight of the polycarbonate and the light blocking agent.

As the light blocking agent, the compound of Chemical Formula 1 can be used alone in order to provide a polycarbonate composition which is transparent while effectively absorbing blue light. However, the present disclosure is not limited thereto, and various light blocking agents (light absorbers) known in the art can be additionally included, if necessary.

Meanwhile, the polycarbonate can include a repeating unit of Chemical Formula 2:

Chemical Formula 2

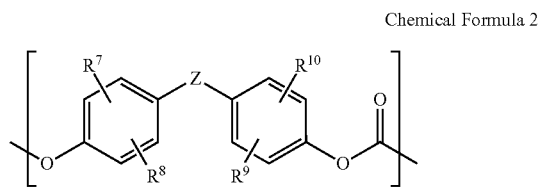

wherein in Chemical Formula 2:
- $R^7$ to $R^{10}$ are each independently hydrogen, a C1 to C10 alkyl group, a C1 to C10 alkoxy group, or halogen; and
- Z is a C1 to C10 alkylene group that is unsubstituted or substituted with phenyl, a C3 to C15 cycloalkylene group that is unsubstituted or substituted with a C1 to C10 alkyl group, O, S, SO, $SO_2$, or CO.

For example, in Chemical Formula 2, $R^7$ to $R^{10}$ can each independently be hydrogen, a methyl group, a methoxy group, Cl, or Br.

For example, in Chemical Formula 2, Z can be a linear or branched C1 to C10 alkylene group that is unsubstituted or substituted with phenyl. Specifically, Z can be a methylene group, an ethane-1,1-diyl group, a propane-2,2-diyl group, a butane-2,2-diyl group, a 1-phenylethane-1,1-diyl group, or a diphenyl group. In addition, Z can be a cyclohexane-1,1-diyl group, O, S, SO, $SO_2$, or CO.

The repeating unit of Chemical Formula 2 can be formed by reacting an aromatic diol compound and a carbonate precursor.

For example, the aromatic diol compound can be at least one selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxy-phenyl)ethane, bisphenol A, 2,2-bis(4-hydroxyphenyl)butane, 1,1-bis(4-hydroxy-phenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxy-phenyl)-1-phenylethane, and bis(4-hydroxyphenyl)diphenylmethane. In addition, the carbonate precursor can be at least one selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate.

The aromatic diol compound and the carbonate precursor can be polymerized by, for example, an interfacial polymerization method to provide a polycarbonate. The interfacial polymerization means that an organic solvent containing a carbonate precursor and an aqueous solution containing an aromatic diol compound are mixed together, and then polymerization occurs at the interface thereof.

In this case, the polymerization reaction is possible at normal pressure and low temperature, and it is easy to control the molecular weight. The interfacial polymerization can be performed in the presence of an acid binder and an organic solvent. In addition, the interfacial polymerization can include, for example, pre-polymerization followed by adding a coupling agent and then performing the polymerization again. In this case, a polycarbonate with a high molecular weight can be obtained.

The polymerization is preferably performed at a temperature of 0° C. to 40° C. for 10 minutes to 5 hours. In addition, it is preferable to maintain the pH of 9 or more or 11 or more during the reaction.

The solvent that can be used in the polymerization is not particularly limited as long as it is a solvent used in the polymerization of polycarbonate. For example, halogenated hydrocarbon such as methylene chloride or chlorobenzene can be used.

In addition, the polymerization is preferably performed in the presence of an acid binder, and the acid binder can be alkali metal hydroxides such as sodium hydroxide or potassium hydroxide, or amine compounds such as pyridine.

In addition, it is preferable to perform the polymerization in the presence of a molecular weight modifier in order to control the molecular weight of the polycarbonate during the polymerization. The molecular weight modifier can be p-tert-butylphenol, p-cumyl phenol, decyl phenol, dodecyl phenol, tetradecyl phenol, hexadecyl phenol, octadecyl phenol, eicosyl phenol, docosyl phenol, triacontyl phenol or the like. Preferably, the molecular weight modifier can be added before the initiation of polymerization, during the initiation of polymerization, or after the initiation of polymerization.

The polycarbonate can have a melt flow rate (MFR) according to ASTM D1238 of 5 to 50 g/10 min. When a polycarbonate having a melt flow rate in the above range is applied to a product with the above-described other components, excellent physical properties can be achieved, and the polycarbonate composition of the embodiment can exhibit excellent processability.

The melt flow rate can be measured under a load of 1.2 kg at 300° C. according to ASTM D1238.

When the melt flow rate is less than 5 g/min, processability can decrease, resulting in a problem of productivity degradation, and when the melt flow rate is greater than 50 g/min, resin flow can be exceeded under the processing conditions, causing surface defects on the molded product. In addition, the melt flow rate can preferably be 7 to 45 g/10 min, 10 to 40 g/10 min, 15 to 40 g/10 min, 20 to 40 g/10 min, or 25 to 35 g/10 min, and the polycarbonate composition with the above melt flow rate can exhibit more excellent processability and mechanical properties.

In addition, the polycarbonate can have a weight average molecular weight of 10,000 g/mol to 60,000 g/mol, 15,000 g/mol to 40,000 g/mol, or 19,000 g/mol to 30,000 g/mol. For example, the weight average molecular weight of the polycarbonate can be measured by a method of ASTM D5296 using polystyrene as a standard material. As the polycarbonate satisfies the weight average molecular weight range, the polycarbonate composition of the embodiment and an optical product including the polycarbonate can exhibit excellent mechanical properties and optical properties.

The polycarbonate described above is a main component of the polycarbonate composition of the embodiment, and can be included in an amount of 80 to 99.999 wt % 90 to 99.999 wt %, 95 to 99.999 wt %, 99 to 99.999 wt % or 99.5 to 99.999 wt % based on the solid content of the total polycarbonate composition. Thereby, the polycarbonate composition of the embodiment can exhibit heat resistance, impact resistance, mechanical strength, and/or transparency inherent in polycarbonate.

The polycarbonate composition can further include various additives known in the art in addition to the above-described light blocking agent. As a non-limiting example, the polycarbonate composition can further include at least one selected from the group consisting of an antioxidant, a heat stabilizer, a light stabilizer, a plasticizer, an antistatic agent, a nucleating agent, a flame retardant, a lubricant, an impact modifier, a fluorescence brightener, an ultraviolet absorber, a pigment, and a dye.

Meanwhile, according to another embodiment of the present disclosure, there is provided an optical product formed from the polycarbonate composition.

The optical product can be applied to various fields related to optical components such as spectacle lenses, light guide plates, and LED lighting.

Since the optical product is made of the polycarbonate composition described above, it has a very low yellow index and thus exhibits high transparency with a very low blue light transmittance, thereby exhibiting excellent blue light blocking effect.

The optical product exhibits a very low yellow index and low transmittance in a blue light region, and is applied to spectacle lenses among the above-described fields to provide transparent spectacles in which blue light is effectively blocked.

A method of providing an optical product from the polycarbonate composition is not particularly limited. As a non-limiting example, the optical product can be prepared by adding an additive commonly used in the technical field to which the present disclosure pertains, if necessary, to the polycarbonate composition and mixing, extruding the mixture into pellets with an extruder, drying the pellets, and then injecting them with an injection molding machine to provide the optical product.

Mixing the polycarbonate composition can be performed by a melt-kneading method, for example, by a method using a ribbon blender, Henschel mixer, Banbury mixer, drum tumbler, single-screw extruder, twin-screw extruder, co-kneader, multi-screw extruder, or the like. The temperature of the melt-kneading can be appropriately adjusted, if necessary.

Next, the melt-kneaded product or pellets can be used as a raw material, and subjected to an injection molding method, an injection compression molding method, an extrusion molding method, a vacuum molding method, a blow molding method, a press molding method, an air pressure molding method, a foaming method, a heat bending molding method, a compression molding method, a calendering molding method, or a rotational molding method.

In the case of using the injection molding method, the polycarbonate composition is placed under high temperature conditions of 200 to 400° C. Since the polycarbonate composition is excellent in heat resistance, it can be applied to the above-described melt-kneading process or injection process with little occurrence of polymer modification or yellowing.

The size, thickness, etc. of the optical product can be appropriately adjusted depending on the purpose of use, and the shape thereof can be flat or curved depending on the purpose of use.

As described above, the optical product according to another exemplary embodiment effectively blocks blue light and exhibits high transparency, so that molded products of various colors can be easily provided.

Hereinafter, the function and effect of the present invention will be described in more detail through specific examples. However, these examples are for illustrative purposes only, and the invention is not intended to be limited by these examples.

Example 1: Preparation of Polycarbonate Composition

A polycarbonate composition was prepared by adding 0.200 wt % of 2-(2,4-dimethoxybenzylidene)malononitrile based on a total weight of the polycarbonate composition to bisphenol A-type linear polycarbonate (weight average molecular weight: 21,100 g/mol; MFR (300° C., 1.2 kg): 30 g/10 min; manufactured by LG Chemical).

Examples 2 to 4 and Comparative Examples 1 to 12: Preparation of Polycarbonate Composition A polycarbonate composition was prepared in the same manner as in Example 1, except that the type and content of the light blocking agent was adjusted as shown in Table 1 below.

TABLE 1

|  | Polycarbonate | Light blocking agent ||||| 
| --- | --- | --- | --- | --- | --- | --- |
|  |  | PB-074 | T326 | M-T326 | T329 | EV-290 |
| Ex. 1 | 99.800 | 0.200 |  |  |  |  |
| Ex. 2 | 99.900 | 0.100 |  |  |  |  |
| Ex. 3 | 99.930 | 0.070 |  |  |  |  |
| Ex. 4 | 99.960 | 0.040 |  |  |  |  |
| Comp. Ex. 1 | 99.395 |  | 0.600 |  |  | 0.005 |
| Comp. Ex. 2 | 99.390 |  | 0.600 |  |  | 0.010 |
| Comp. Ex. 3 | 99.385 |  | 0.600 |  |  | 0.015 |
| Comp. Ex. 4 | 98.500 |  | 1.500 |  |  |  |
| Comp. Ex. 5 | 99.980 |  |  |  |  | 0.020 |
| Comp. Ex. 6 | 99.960 |  |  | 0.040 |  |  |
| Comp. Ex. 7 | 99.930 |  |  | 0.070 |  |  |
| Comp. Ex. 8 | 99.900 |  |  | 0.100 |  |  |
| Comp. Ex. 9 | 99.500 |  |  | 0.500 |  |  |
| Comp. Ex. 10 | 99.000 |  |  | 1.000 |  |  |
| Comp. Ex. 11 | 99.600 |  |  |  | 0.400 |  |
| Comp. Ex. 12 | 99.200 |  |  |  | 0.800 |  |

(Unit: wt %)

PB-074: 2-(2,4-dimethoxybenzylidene)malononitrile

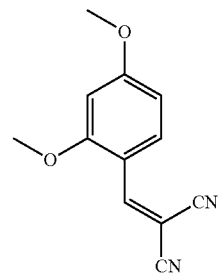 [SMILES: COc1ccc(C=C(C#N)C#N)c(OC)c1]

T326: Tinuvin® 326 (Manufactured by BASF)

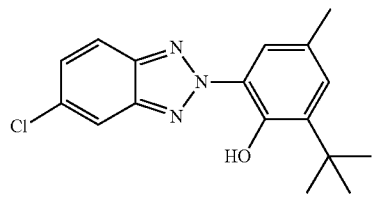 [SMILES: Cc1cc(-n2nc3ccc(Cl)cc3n2)c(O)c(C(C)(C)C)c1]

M-T326: 2-tert-butyl-4-methyl-6-(5-(phenylthio)-2H-benzo[d][1,2,3]-triazol-2-yl)phenol

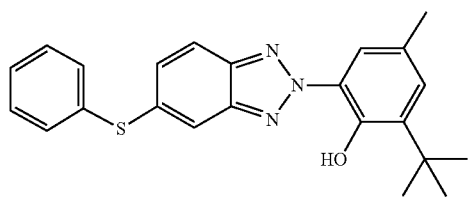 [SMILES: Cc1cc(-n2nc3ccc(Sc4ccccc4)cc3n2)c(O)c(C(C)(C)C)c1]

T329: Tinuvin 329 (Manufactured by BASF)

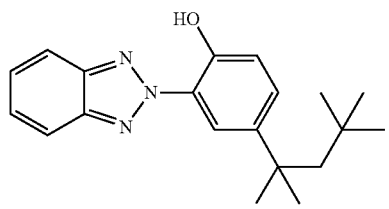 [SMILES: CC(C)(C)CC(C)(C)c1ccc(O)c(-n2nc3ccccc3n2)c1]

EV-290: X-GUARD EV-290 (Manufactured by Chempia)

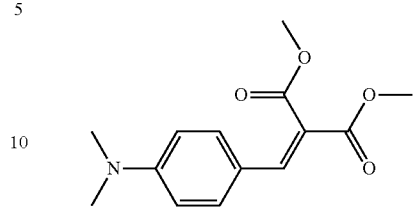

Experimental Examples: Evaluation of Physical Properties of Polycarbonate Composition After preparing specimens from the polycarbonate compositions prepared in Examples and Comparative Examples by the method described below, their physical properties were evaluated, and the results are shown in Table 2.

1) Preparation of Specimen

The polycarbonate composition was supplied to a twin-screw extruder (L/D=36, Φ=45, barrel temperature of 240° C.) at 55 kg per hour to prepare pellets, and the pellets were injection-molded to prepare a specimen having width, length, and thickness of 50 mm, 30 mm, and 3 mm, respectively.

2) Yellow Index (YI)

The yellow index was measured at room temperature (20° C.) with UltraScan PRO (manufactured by HunterLab) according to ASTM D1925.

3) Transmittance

The transmittance at 410 nm and 420 nm were measured with UltraScan PRO (manufactured by HunterLab) according to ASTM D1003.

4) Notched Izod Impact Strength

The impact strength of the ¼" specimen (¼ inch (6.35 mm) thick specimen) was measured according to ASTM D256.

5) Total Volatile Organic Compounds (TVOC)

After placing each specimen prepared above in a heating desorption apparatus (JTD-505III manufactured by Japan Analytical Industry), volatile organic compounds released from the specimen at 280° C. for 15 minutes were collected, and the amount thereof was measured by GC-MS.

TABLE 2

| | light blocking agent content* | YI | Transmittance at 410 nm (%) | Transmittance at 420 nm (%) | 5YT420[a] | YT410[b] | Impact strength (J/m) | TVOC (ppm) |
|---|---|---|---|---|---|---|---|---|
| Ex. 1 | 0.200 | 11.20 | 1.14 | 10.32 | 66.32 | 12.34 | 697 | 207 |
| Ex. 2 | 0.100 | 8.92 | 2.02 | 20.88 | 65.48 | 10.94 | 715 | 114 |
| Ex. 3 | 0.070 | 7.33 | 2.62 | 26.20 | 62.85 | 9.95 | 720 | 65 |
| Ex. 4 | 0.040 | 4.82 | 5.91 | 46.65 | 70.75 | 10.73 | 711 | 48 |
| Comp. Ex. 1 | 0.605 | 8.57 | 6.70 | 41.81 | 84.66 | 15.27 | 547 | 450 |
| Comp. Ex. 2 | 0.610 | 10.24 | 4.55 | 34.65 | 85.85 | 14.79 | 550 | 471 |
| Comp. Ex. 3 | 0.615 | 11.95 | 3.40 | 28.45 | 88.20 | 15.35 | 552 | 462 |
| Comp. Ex. 4 | 1.500 | 12.00 | 1.21 | 15.38 | 75.38 | 13.21 | 109 | 951 |
| Comp. Ex. 5 | 0.020 | 14.18 | 5.32 | 29.23 | 100.31 | 19.50 | 724 | 42 |
| Comp. Ex. 6 | 0.040 | 2.83 | 43.54 | 78.85 | 93.00 | 46.37 | 698 | 34 |
| Comp. Ex. 7 | 0.070 | 3.44 | 28.62 | 73.29 | 90.43 | 32.06 | 718 | 39 |

TABLE 2-continued

|  | light blocking agent content* | YI | Transmittance at 410 nm (%) | Transmittance at 420 nm (%) | 5YT420[a)] | YT410[b)] | Impact strength (J/m) | TVOC (ppm) |
|---|---|---|---|---|---|---|---|---|
| Comp. Ex. 8 | 0.100 | 4.06 | 19.97 | 67.88 | 88.18 | 24.03 | 709 | 48 |
| Comp. Ex. 9 | 0.500 | 9.78 | 1.54 | 22.38 | 71.28 | 11.32 | 642 | 226 |
| Comp. Ex. 10 | 1.000 | 12.98 | 1.08 | 9.43 | 74.33 | 14.06 | 498 | 430 |
| Comp. Ex. 11 | 0.400 | 2.88 | 38.78 | 76.35 | 90.75 | 41.66 | 699 | 244 |
| Comp. Ex. 12 | 0.800 | 2.53 | 46.89 | 79.34 | 91.99 | 49.42 | 546 | 430 |

*The content of the light blocking agent is in wt % based on the solid content of the polycarbonate composition.
[a)]5YT420 is a value obtained by adding the transmittance at 420 nm to a value 5 times the yellow index.
[b)]YT410 is a value obtained by adding the transmittance at 410 nm to the yellow index Referring to Comparative Examples 1 to 3 in which T326 and EV-290 were used together as a light blocking agent, when the content of the light blocking agent was increased to sufficiently lower the blue light transmittance, the yellow index became too high, so that the 5YT420 and the YT410, which are indexes capable of confirming a balance between the yellow index and the blue light transmittance, were very high as 84.66 to 88.20 and 14.79 to 15.35, respectively. In addition, a significant amount of the light blocking agent was added in Comparative Examples 1 to 3 to lower the blue light transmittance to a certain level, resulting in very low impact resistance and high TVOC.

In Comparative Example 4, the transmittance at 420 nm was reduced to 15.38% by using only T326 as a light blocking agent in excess, but the yellow index was very high as 12. Accordingly, YT420 and YT410, which are indexes capable of confirming a balance between the yellow index and the blue light transmittance, were high as 75.38 and 13.21, respectively, and it was confirmed that impact resistance became very poor and TVOC was rapidly increased.

Referring to Comparative Example 5, only a small amount of EV-290, a light blocking agent, could give a sufficiently low blue light transmittance, thereby providing a specimen having excellent impact resistance and low TVOC. However, even if only a very small amount of EV-290 was added, the yellow index rapidly increased to provide a strong yellow specimen.

Referring to Comparative Examples 6 to 10 in which M-T326 was used as a light blocking agent, the degree of increase in the yellow index was large compared to the decrease in the blue light transmittance by the increase in the amount of the light blocking agent. Accordingly, even if the content of the light blocking agent is adjusted to 0.040 wt % to 1.000 wt %, it was confirmed that 5YT420, an index capable of confirming a balance between the yellow index and the blue light transmittance, did not decrease to the level of Examples. In Comparative Examples 6 to 10, although there were some points where YT410 was lowered to the level of Examples, the polycarbonate composition of Comparative Example 9 with low YT410 of 11.32 had an impact strength of 642 J/m and TVOC of 226 ppm. Thus, it is difficult to use the composition of Comparative Example 9 for applications that must meet a certain level of impact resistance and TVOC, such as spectacle lenses, light guide plates, or LED lighting.

In the case of Comparative Examples 11 and 12, even though T329, a light blocking agent, was used in excess compared to the Examples, the blue light transmittance was not sufficiently lowered, and 5YT420 and YT410, which are indexes capable of confirming a balance between the yellow index and the blue light transmittance, were high as 90.75 to 91.99 and 41.66 to 49.42, respectively. In addition, Comparative Example 11 had high TVOC, and Comparative Example 12 was poor in impact resistance as well as TVOC.

On the other hand, it was confirmed that the specimens formed from the polycarbonate compositions of Examples 1 to 4 had very low 5YT420 and YT410, which are indexes capable of confirming a balance between the yellow index and the blue light transmittance, of 62.85 to 70.75 and 9.95 to 12.34, respectively, as well as excellent impact resistance and very low TVOC.

Accordingly, it could be confirmed that when the polycarbonate composition according to an embodiment of the present disclosure is used, an optical product with low TVOC capable of effectively blocking blue light while maintaining excellent transparency and impact resistance of the polycarbonate can be provided.

The invention claimed is:
1. A polycarbonate composition, comprising:
a polycarbonate; and
a light blocking agent,
wherein 5YT420 calculated by the following Equation 1 is 2.5 to 71:

$$5YT420 = (5*Y) + T420 \qquad \text{<Equation 1>}$$

wherein in Equation 1:
Y is a yellow index measured according to ASTM D1925 for a specimen having a thickness of 3 mm formed from the polycarbonate composition, and
T420 is a transmittance at 420 nm measured according to ASTM D1003; and
wherein YT410 calculated by the following Equation 2 is 2 to 13:

$$YT410 = Y + T410 \qquad \text{<Equation 2>}$$

wherein in Equation 2:
Y is a yellow index measured according to ASTM D1925 for a specimen having a thickness of 3 mm formed from the polycarbonate composition, and
T410 is a transmittance at 410 nm measured according to ASTM D1003.
2. The polycarbonate composition of claim 1, wherein the 5YT420 calculated by the Equation 1 is 60 to 66.

3. The polycarbonate composition of claim 1,
wherein the transmittance at 420 nm measured according to ASTM D1003 for a specimen having a thickness of 3 mm formed from the polycarbonate composition is 0.1 to 47%.

4. The polycarbonate composition of claim 1,
wherein the transmittance at 410 nm measured according to ASTM D1003 for a specimen having a thickness of 3 mm formed from the polycarbonate composition is 0.01 to 6.0%.

5. The polycarbonate composition of claim 1,
wherein the yellow index measured according to ASTM D1925 for a specimen having a thickness of 3 mm formed from the polycarbonate composition is 0.1 to 11.5.

6. The polycarbonate composition of claim 1,
wherein an impact strength measured according to ASTM D256 for a specimen having a thickness of 6.35 mm formed from the polycarbonate composition is 680 to 800 J/m.

7. The polycarbonate composition of claim 1,
wherein an amount of total volatile organic compounds released for 15 minutes at 280° C. in a specimen having a thickness of 3 mm formed from the polycarbonate composition is 0 to 210 ppm.

8. A polycarbonate composition, comprising:
a polycarbonate; and
a light blocking agent,
wherein 5YT420 calculated by the following Equation 1 is 2.5 to 71:

$$5YT420 = (5*Y) + T420 \qquad \text{<Equation 1>}$$

wherein in Equation 1:
Y is a yellow index measured according to ASTM D1925 for a specimen having a thickness of 3 mm formed from the polycarbonate composition, and
T420 is a transmittance at 420 nm measured according to ASTM D1003,
wherein the light blocking agent comprises a compound of Chemical Formula 1:

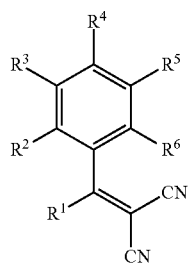

Chemical Formula 1 wherein in Chemical Formula 1:
$R^1$ is hydrogen, halogen, a hydroxyl group or a cyano group; and
$R^2$ to $R^6$ are each independently hydrogen, halogen, a hydroxyl group, a cyano group, or a C1 to C5 alkoxy group, provided that at least one of $R^2$ to $R^6$ is halogen, a hydroxyl group, a cyano group, or a C1 to C5 alkoxy group.

9. The polycarbonate composition of claim 8, wherein the $R^1$ is hydrogen.

10. The polycarbonate composition of claim 8,
wherein at least one of $R^2$ to $R^6$ is a C1 to C5 alkoxy group, and the rest are hydrogen, halogen, a hydroxyl group, a cyano group, or a C1 to C5 alkoxy group.

11. The polycarbonate composition of claim 8,
wherein 2 to 4 of $R^2$ to $R^6$ are C1 to C5 alkoxy groups, and the rest are hydrogen.

12. The polycarbonate composition of claim 1,
wherein the light blocking agent is included in an amount of 0.001 to 0.500 wt % based on a total weight of the polycarbonate and the light blocking agent.

13. The polycarbonate composition of claim 1,
wherein the polycarbonate comprises a repeating unit of Chemical Formula 2:

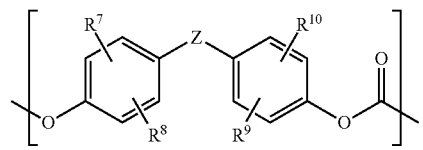

Chemical Formula 2 wherein in Chemical Formula 2:
$R^7$ to $R^{10}$ are each independently hydrogen, a C1 to C10 alkyl group, a C1 to C10 alkoxy group, or halogen; and
Z is a C1 to C10 alkylene group that is unsubstituted or substituted with phenyl, a C3 to C15 cycloalkylene group that is unsubstituted or substituted with a C1 to C10 alkyl group, O, S, SO, $SO_2$, or CO.

14. An optical product comprising the polycarbonate composition of claim 1.

15. The optical product of claim 14, wherein the optical product is a spectacle lens.

16. The polycarbonate composition of claim 8, wherein:
the transmittance at 420 nm measured according to ASTM D1003 for a specimen having a thickness of 3 mm formed from the polycarbonate composition is 0.1 to 47%; and
the transmittance at 410 nm measured according to ASTM D1003 for a specimen having a thickness of 3 mm formed from the polycarbonate composition is 0.01 to 6.0%.

17. The polycarbonate composition of claim 8,
wherein the yellow index measured according to ASTM D1925 for a specimen having a thickness of 3 mm formed from the polycarbonate composition is 0.1 to 11.5.

18. The polycarbonate composition of claim 8,
wherein an impact strength measured according to ASTM D256 for a specimen having a thickness of 6.35 mm formed from the polycarbonate composition is 680 to 800 J/m.

19. An optical product comprising the polycarbonate composition of claim 8.

20. The optical product of claim 19, wherein the optical product is a spectacle lens.

* * * * *